United States Patent
Jung et al.

(10) Patent No.: US 8,488,276 B1
(45) Date of Patent: Jul. 16, 2013

(54) PERPENDICULAR MAGNETIC RECORDING MEDIUM WITH GRAIN ISOLATION MAGNETIC ANISTROPY LAYER

(75) Inventors: Hong-Sik Jung, Pleasanton, CA (US); Donald Stafford, San Jose, CA (US); B. Ramamurthy Acharya, Fremont, CA (US); Sudhir S. Malhotra, Fremont, CA (US); Gerardo A. Bertero, Redwood City, CA (US)

(73) Assignee: WD Media, LLC, San Jose, CA (US)

( * ) Notice: Subject to any disclaimer, the term of this patent is extended or adjusted under 35 U.S.C. 154(b) by 930 days.

(21) Appl. No.: 12/242,210

(22) Filed: Sep. 30, 2008

(51) Int. Cl.
*G11B 5/82* (2006.01)
*G11B 5/66* (2006.01)
*G11B 5/851* (2006.01)

(52) U.S. Cl.
USPC ........ 360/135; 428/827; 428/831; 29/603.13; 29/603.14

(58) Field of Classification Search
USPC ............... 360/135; 427/131; 428/827, 831, 428/831.2; 29/603.13, 603.14
See application file for complete search history.

(56) References Cited

U.S. PATENT DOCUMENTS

| | | | |
|---|---|---|---|
| 5,034,286 A | 7/1991 | Nasu et al. | |
| 5,326,637 A | 7/1994 | Nasu et al. | |
| 5,392,290 A | 2/1995 | Brown et al. | |
| 5,820,963 A | 10/1998 | Lu et al. | |
| 5,840,394 A | 11/1998 | Ranjan et al. | |
| 6,406,600 B1 | 6/2002 | Takashima | |
| 6,410,133 B1 | 6/2002 | Kirino et al. | |
| 6,472,047 B1 | 10/2002 | Kirino et al. | |
| 6,495,252 B1 * | 12/2002 | Richter et al. | 428/336 |
| 6,534,206 B1 | 3/2003 | Kirino et al. | |
| 6,602,620 B1 | 8/2003 | Kikitsu et al. | |
| 6,730,421 B1 | 5/2004 | Kirino et al. | |
| 6,749,955 B2 | 6/2004 | Kirino et al. | |
| 6,797,137 B2 | 9/2004 | Sandlin et al. | |
| 6,811,890 B1 * | 11/2004 | Zhou et al. | 428/828.1 |
| 6,866,948 B2 | 3/2005 | Koda et al. | |
| 6,881,503 B2 | 4/2005 | Lu et al. | |
| 7,033,686 B2 | 4/2006 | Hirayama et al. | |
| 7,141,316 B2 | 11/2006 | Iwasaki et al. | |
| 7,226,674 B2 | 6/2007 | Koda et al. | |
| 7,229,588 B2 | 6/2007 | Sandlin et al. | |
| RE40,100 E | 2/2008 | Zhang | |
| 7,482,071 B2 | 1/2009 | Do et al. | |

(Continued)

FOREIGN PATENT DOCUMENTS

JP 2005353256 A 12/2005
WO 2009044794 4/2009

OTHER PUBLICATIONS

J. Ariake et al., "Co-Pt-TiO2 Composite Film for Perpendicular Magnetic Recording Medium", IEEE Transactions on Magnetics, vol. 41, No. 10, pp. 3142-3144, Oct. 2005.

(Continued)

*Primary Examiner* — Julie Anne Watko

(57) ABSTRACT

A perpendicular magnetic recording (PMR) media including a non-magnetic or superparamagnetic grain isolation magnetic anisotropy layer (GIMAL) to provide a template for initially well-isolated small grain microstructure as well as improvement of $K_u$ in core grains of a magnetic recording layer. The GIMAL composition may be adjusted to have lattice parameters similar to a bottom magnetic recording layer and to provide a buffer for reducing interface strains caused by lattice mismatch between the bottom magnetic recording layer and an underlying layer.

28 Claims, 10 Drawing Sheets

U.S. PATENT DOCUMENTS

| | | | |
|---|---|---|---|
| 2002/0110707 | A1 | 8/2002 | Kirino et al. |
| 2003/0054202 | A1 | 3/2003 | Arisaka et al. |
| 2003/0134154 | A1 | 7/2003 | Kirino et al. |
| 2004/0166376 | A1 | 8/2004 | Kirino et al. |
| 2004/0185308 | A1 | 9/2004 | Koda et al. |
| 2005/0100764 | A1* | 5/2005 | Ranjan et al. .......... 428/694 TM |
| 2005/0202286 | A1* | 9/2005 | Chen et al. .................... 428/831 |
| 2005/0214520 | A1 | 9/2005 | Oikawa et al. |
| 2005/0214588 | A1 | 9/2005 | Iwasaki et al. |
| 2005/0255336 | A1 | 11/2005 | Mukai |
| 2006/0090998 | A1 | 5/2006 | Honda et al. |
| 2006/0199044 | A1* | 9/2006 | Thangaraj et al. ............ 428/829 |
| 2006/0204791 | A1* | 9/2006 | Sakawaki et al. .......... 428/828.1 |
| 2006/0286414 | A1 | 12/2006 | Racine et al. |
| 2006/0289294 | A1 | 12/2006 | Racine et al. |
| 2007/0172706 | A1 | 7/2007 | Chen |
| 2007/0189916 | A1 | 8/2007 | Zhang |
| 2008/0206601 | A1* | 8/2008 | Mukai ........................... 428/831 |
| 2009/0296278 | A1 | 12/2009 | Inamura et al. |
| 2010/0140727 | A1 | 6/2010 | Shimatsu et al. |
| 2010/0247962 | A1 | 9/2010 | Sasaki |

OTHER PUBLICATIONS

H. S. Jung et al., "CoCrPtO-Based Granular Composite Perpendicular Recording Media", IEEE Transactions on Magnetics, vol. 43, No. 6, pp. 2088-2090, Jun. 2007.

S. H. Park et al., "Effect of MgO and Al2O3 on the Microstructure and Magnetic Properties of CoCrPt-oxide Perpendicular Recording Media", Journal of Applied Physics, vol. 97, No. 10, pp. 106-1-3, 2005.

H. S. Jung et al., "Effect of Oxygen Incorporation on Microstructure and Media Performance in CoCrPt-SiO2 Perpendicular Recording Media", IEEE Transactions on Magnetics, vol. 43, No. 2, pp. 615-620, Feb. 2007.

G. Choe et al., "Magnetic and Recording Characteristics of Reactively Sputtered CoPtCr-(Si-O, Ti-O, and Cr-O) Perpendicular Media", IEEE Transactions on Magnetics, vol. 42, No. 10, pp. 2327-2329, Oct. 2006.

Thomas P. Nolan et al., "Microstructure and Exchange Coupling of Segregated Oxide Perpendicular Recording Media", IEEE Transactions on Magnetics, vol. 43, No. 2, pp. 639-644, Feb. 2007.

H. S. Jung et al., "Origin of Incoherent Magnetic Switching Behavior in CoCrPt-SiO2 Perpendicular Magnetic Recording Media", Applied Physics Letters, vol. 91, No. 212502, pp. 1-3, 2007.

M. Zheng et al., "Role of Oxygen Incorporation in Co-Cr-Pt-Si-O Perpendicular Magnetic Recording Media", IEEE Transactions on Magnetics, vol. 40, No. 4, pp. 2498-2500, Jul. 2004.

S. N. Piramanayagam et al., "Advanced Perpendicular Recording Media Structure With a Magnetic Intermediate Layer", Applied Physics Letters, vol. 88, No. 092501, pp. 1-3, 2006.

Gary C. Rauch et al., "The Effect of Cluster Size on Media Noise in Co-Ni-P Thin Films", IEEE Transactions on Magnetics, vol. 28, No. 5, pp. 3105-3107, Sep. 1992.

Atsushi Hashimoto et al., "Improvement of Magnetic Properties of Granular Perpendicular Recording Media by Using a FCC Nonmagnetic Intermediate Layer With Stacking Faults", Applied Physics Letters, vol. 89, No. 262508, pp. 1-3, 2006.

Atsushi Hashimoto et al., "Pseudo-HCP Nonmagnetic Intermediate Layer for Granular Media with High Perpendicular Magnetic Anisotropy", Journal of Physics D: Applied Physics, vol. 41, No. 012002, pp. 1-4, 2008.

K. W. Wierman et al., "RuxCr1-x/Ta Underlayer for Co-alloy Perpendicular Magnetic Recording", Journal of Applied Physics, vol. 91, No. 10, pp. 8031-8033, May 2002.

Hua Yuan et al., "Ru+Oxide Interlayer for Perpendicular Magnetic Recording Media", Journal of Applied Physics, vol. 103, 07F513, pp. 1-3, 2008.

Unoh Kwon et al., "Ru/Ru-Oxide Interlayers for CoCrPtO Perpendicular Recording Media", IEEE Transactions on Magnetics, vol. 41, No. 10, pp. 3193-3195, Oct. 2005.

"Effect of magnetic softness in a soft layer on media properties of hard/soft stacked composite perpendicular media," by Jung et al., from the Journal of Applied Physics 105, dated Nov. 13, 2008, 3 pages.

"TMR and Squeeze at Gigabit Areal Densities," by Arnett et al., from IEEE Transactions on Magnetics, vol. 28, No. 4, Jul. 1992, 4 pages.

\* cited by examiner

US 8,488,276 B1

PERPENDICULAR MAGNETIC RECORDING MEDIUM WITH GRAIN ISOLATION MAGNETIC ANISTROPY LAYER

TECHNICAL FIELD

This invention relates to the field of disk drives and more specifically, to magnetic recording media used in disk drives.

BACKGROUND

Magnetic recording media has begun to incorporate perpendicular magnetic recording (PMR) technology in an effort to increase areal density and has recently demonstrated densities of 612 Gbits/in$^2$. Generally, PMR media may be partitioned into three functional regions: a soft magnetic underlayer (SUL), a nonmagnetic intermediate layer (NMIL) and a magnetic recording layer (RL). Well-isolated smaller grains of higher magnetic anisotropy constant ($K_u$) for a bottom magnetic recording layer can reduce media noise to achieve these higher areal densities. Enhanced grain isolation in a bottom magnetic recording layer of a PMR media structure, for example, can provide a smaller magnetic cluster size and narrow the size distribution.

While microstructure of a magnetic recording layer can be improved by controlling oxide content in the magnetic recording layer (e.g., bottom magnetic recording layer), enhancement of grain isolation by such means induces undesirable side effects, such as worse thermal stability, nonuniform grain isolation along the film thickness direction, broader crystallographic c-axis orientation and wider magnetic anisotropy dispersion.

BRIEF DESCRIPTION OF THE DRAWINGS

The present invention is illustrated by way of example, and not limitation, in the figures of the accompanying drawings in which.

DETAILED DESCRIPTION

Figure 1:
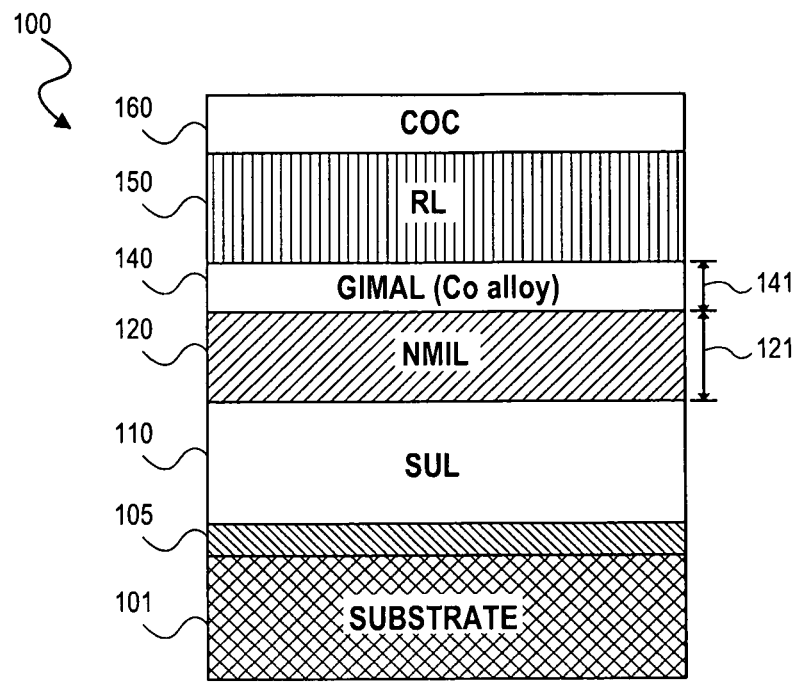
FIGS. 1, 2A and 2B illustrate a cross-sectional view of a perpendicular magnetic media structures in accordance with an embodiment.

In the following description, numerous specific details are set forth such as examples of specific, components, processes, etc. to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention include an intermediate layer, referred to herein as a grain isolation magnetic anisotropy layer (GIMAL), to provide a template for initially well-isolated small grain microstructure as well as improvement of Ku in core grains of a magnetic recording layer. A GIMAL is an HCP cobalt (Co) containing alloy-oxide material which is either non-magnetic or superparamagnetic, depending on the embodiment. For superparamagnetic embodiments, a GIMAL has a saturation magnetization ($M_s$) less than approximately 200 emu/cm3. The GIMAL composition may be adjusted to have lattice parameters similar to a bottom magnetic recording layer and to provide a buffer for reducing interface strains caused by lattice mismatch between the bottom magnetic recording layer and an underlying, Co-free NMIL layer. Because a GIMAL remains non-magnetic or superparamagnetic, high levels of strain within the GIMAL detract little from the performance of a magnetic recording layer. Because a GIMAL includes at least one oxide material, the grain microstructure may be well-isolated while improving crystallinity of core grains in a magnetic recording layer. It has been found that a GIMAL, as further described herein, may mitigate undesirable side effects associated with forming a magnetic recording layer with a target having high oxide content or reactively sputtering the magnetic recording layer with high partial pressures of $O_2$. It has been found that incorporation of a GIMAL in a PMR media structure may improve coercivity ($H_c$) and $K_u$ of the magnetic recording layer and improve one or more of thermal stability, media signal to noise ratio (SNR) and media bit error rates (BER) relative to PMR media structure lacking a GIMAL.

FIG. 1 illustrates a cross-sectional view of an embodiment of a PMR media structure 100 including a GIMAL 140 disposed between a SUL 110 and a magnetic recording layer (RL) 150, in accordance with an embodiment of the present invention. It should be appreciated that the layers discussed herein may be formed on both sides of substrate to form a double-sided magnetic recording disk. However, only the layers on a single side of substrate are shown for ease of illustration. Alternatively, a single sided perpendicular magnetic recording disk may be formed.

As shown in FIG. 1, the GIMAL 140 is disposed on non-magnetic intermediate layer (NMIL) 120. Thus, the GIMAL 140 may be considered a second intermediate layer disposed on a first intermediate layer (NMIL 120). In the particular embodiment depicted in FIG. 1, the GIMAL 140 is inserted between the NMIL 120 and the magnetic recording layer 150. While the preferred embodiment disposes the recording layer 150 on the GIMAL 140 (i.e. GIMAL 140 is in contact with the bottom surface of the recording layer 150), other layers may be present between the GIMAL 140 and recording layer 150. As further depicted in FIG. 1, the GIMAL 140 is disposed on the NMIL 120 to be in contact with the top surface of the NMIL 120.

In an embodiment, the GIMAL 140 includes up to 25% of one or more oxide materials. In particular embodiments, the oxide materials include at least one non-cobalt oxide and may further include a cobalt oxide, such as CoO. Generally, a non-cobalt oxide is any oxide which does not include cobalt. Exemplary non-cobalt oxides, include silicon dioxide ($SiO_2$), chromium oxides (e.g., chromium(IV) oxide ($CrO_2$) or chromium(III) oxide ($Cr_2O_3$)), titanium oxides (e.g., titanium(IV) oxide ($TiO_2$) or titanium(III) oxide ($Ti_2O_3$)), tantalum oxides (e.g., tantalum(V) oxide ($Ta_2O_5$)), niobium oxides (e.g., niobium(V) oxide ($Nb_2O_5$)), nickel oxides (e.g., nickel (II) oxide (NiO)), zirconium dioxide ($ZrO_2$), hafnium dioxide ($HfO_2$), vanadium oxides (e.g., vanadium(V) oxide ($V_2O_5$)), aluminum oxide ($Al_2O_3$) and tungsten oxides (e.g., tungsten(VI) oxide ($WO_3$) or tungsten(IV) oxide ($WO_2$)). Other non-cobalt oxides known in the art may also be utilized in a GIMAL.

The GIMAL 140 may further include chromium (Cr). In particular embodiments, chromium may be present up to approximately 40 atomic percent (at. %) and is preferably greater than approximately 20 at. % to render the GIMAL 140 either non-magnetic or superparamagnetic. Substitution of Co with Cr in a GIMAL reduces magnetization of the layer while maintaining lattice parameters. Embodiments having Cr may further include a chromium oxide in addition to a cobalt oxide. Chromium in a CoCr alloy-oxide GIMAL may be expected to oxidize preferentially over cobalt. It has been found the enhanced Cr oxidation provides wider grain boundary (GB) width to achieve a magnetic recording layer with relatively higher $K_u$, smaller grains and wider GB width for a given recording layer thickness. In a further embodiment, a CrCo alloy-oxide GIMAL includes at least one non-cobalt, non-chromium oxide grain isolation material, such as any of those oxides previously described.

In particular embodiments, the GIMAL 140 may further include either platinum (Pt), palladium (Pd) or ruthenium (Ru) to adjust the lattice match between the magnetic recording layer 150 and the GIMAL 140. Thus, in particular embodiments, the GIMAL 140 may be a $(CoCr_X)_Y$-oxide$_Z$ system, where X is between 25 and 40, Y is between 85 and 94 and Z is between 5 and 16 in preferred embodiments, or a $(CO_VCr_W(Pt,Pd,\text{ or }Ru)_X)_Y$-oxide$_Z$) system, where V is between 20 and 60, W is between 0 and 40, X is between 0 and 40, Y is between 85 and 94 and Z is between 5 and 16 in preferred embodiments. In either system, the cobalt can be substituted with nickel (Ni) up to approximately 20%. Small amounts of boron (B), molybdenum (Mo), niobium (Nb), tantalum (Ta), titanium (Ti), zirconium (Zr), tungsten (W), hafnium (Hf), osmium (Os), iridium (Ir), rhenium (Re), or other elements may also be added, up to approximately 7%, to stabilize the HCP phase of the GIMAL 140.

The GIMAL 140 has a thickness 141 that may be anywhere between approximately 0.5 nanometers (nm) and 10 nm. Generally, the GIMAL 140 is a relatively thin layer to provide highest $H_c$, as discussed further elsewhere herein. The thickness 141 is preferably less than 6 nm and most preferably 2 nm or less for highest media SNR and media BER, as discussed further elsewhere herein.

As depicted in FIG. 1, the PMR media structure 100 further includes a substrate 101. Substrate 101 may be, for example, a glass, a metal, and/or a metal alloy material. In a particular embodiment, the substrate 101 is disk-shaped or annular. Glass substrates that may be used include, for example, a silica containing glass such as borosilicate glass and aluminosilicate glass. Metal and metal alloy substrates that may be used include, for example, aluminum (Al) and aluminum magnesium (AlMg) substrates, respectively. In an alternative embodiment, other substrate materials such as polymers and ceramics may be used. Substrate 101 may also be plated with a nickel phosphorous (NiP) layer (not shown). The substrate surface (or the plated NiP surface) may be polished and/or textured. A seed layer or adhesion layer 105 (e.g., Cr) may be disposed over the substrate. Substrates and seed layers are known in the art and accordingly a more detailed discussion is not provided.

Disposed over the substrate 101 and adhesion layer 105 is a SUL 110. Generally, the SUL 110 may include any materials known in the art. In one exemplary embodiment the SUL 110 includes a synthetic antiferromagnet (SAF) structure comprising two soft ferromagnetic layers (e.g., CoTaZr or CoFeTaZr, etc.) antiferromagnetically coupled with one another across a spacer layer (e.g., Ru, Re, Rh, Ir) disposed there between. Other SUL layer structures known in the art may similarly be utilized in a PMR media structure employing the GIMAL 140.

One or more non-magnetic intermediate layers may be disposed between the SUL 110 and the GIMAL 140. Depending on the embodiment, a NMIL disposed under the GIMAL 140 may have any crystal structure, exemplary structures include an HCP layer, a face centered cubic (FCC) layer, a body centered cubic (BCC) layer. As depicted, the NMIL 120, in contact with the interface of the GIMAL 140, may generally have a thickness 121 anywhere between two and five times the thickness 141 of the GIMAL 140.

In a first embodiment, the NMIL 120 is an HCP material layer. One exemplary HCP material is Ru, however, the NMIL 120 may include any HCP NMIL material known in the art, such as but not limited to, Rh and Re (pure or alloyed). For certain embodiments where the NMIL 120 is a Ru layer, the thickness 121 is greater than that of the GIMAL and may be between 5 nm and 30 nm. Where the NMIL 120 includes Ru, the GIMAL 140 may prevent a highly exchange coupled initial magnetic recording layer (i.e. proximate to the interface of recording layer 150) from forming when disposed on top of the NMIL 120. For embodiments including Ru, the GIMAL 140 may advantageously reduce lattice mismatch at the interface between the recording layer 150 and the NMIL 120. In a further embodiment, Ru in the NMIL 120 may be alloyed with at least one other constituent, for example Cr, to form an alloyed HCP material.

In another embodiment, the NIML 120 is a pseudo-HCP material. A pseudo-HCP material generally has an FCC structure with stacking faults. Exemplary pseudo-HCP materials include, but are not limited to Ir, Pd, Au, Pt, Ni alloyed with any metal capable of forming an FCC based solid solution, such as Cr, Ti, Zr and Nb. For embodiments where the NIML 120 is a pseudo-HCP material, the GIMAL 140 may reduce the amount of stacking faults in the grains of the magnetic recording layer 150 by reducing the lattice mismatch between the magnetic grains and the NIML 120. Furthermore, the composition of the GIMAL 140 may be selected within the parameters described herein for improved wetting of a pseudo-HCP material.

Figure 2A:
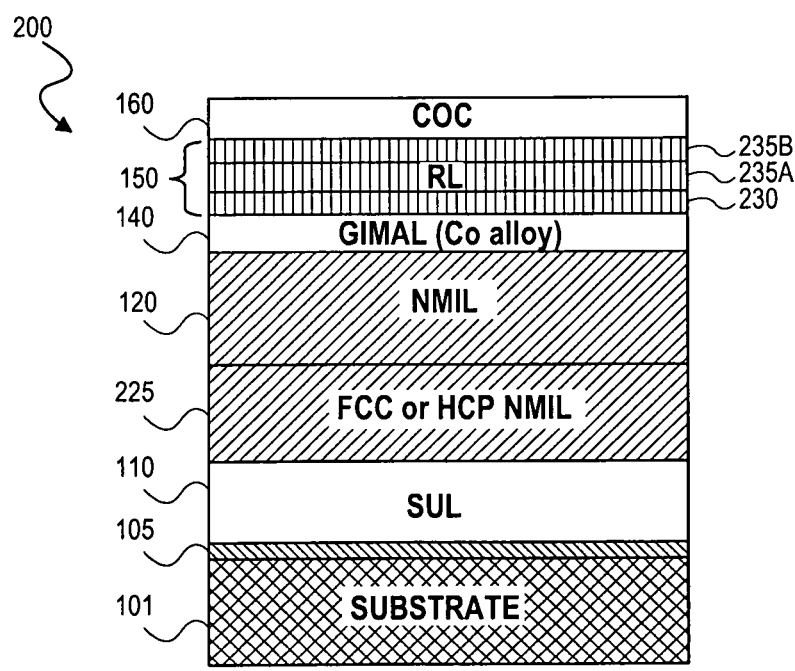

PMR media structures in accordance with the present invention may include more than one NMIL disposed under a GIMAL. For example, FIG. 2A depicts one embodiment where a PMR media structure 200 includes an FCC or HCP NMIL 225 disposed under the NMIL 120 (i.e. the FCC or HCP NMIL 225 provides a third intermediate layer in addition to the first intermediate layer (NMIL 120) and second intermediate layer (GIMAL 140)). In one such embodiment, as depicted in FIG. 2A, the NMIL 120 is disposed on the FCC or HCP NMIL 225. Thus, in a particular embodiment the GIMAL 140 is disposed on the NMIL 120, which is an HCP material (e.g., a Ru layer), with the HCP material of NMIL 120 disposed on the FCC or HCP NMIL 225. Exemplary FCC materials which may be used for the FCC or HCP NMIL 225 include, but are not limited to, NiW, NiTi, NiFeCr, PtCr, IrMn or PdCr. An exemplary HCP material which may be used for the FCC or HCP NMIL 225 is RuCr, but any material known in the art may also be utilized.

Figure 2B:
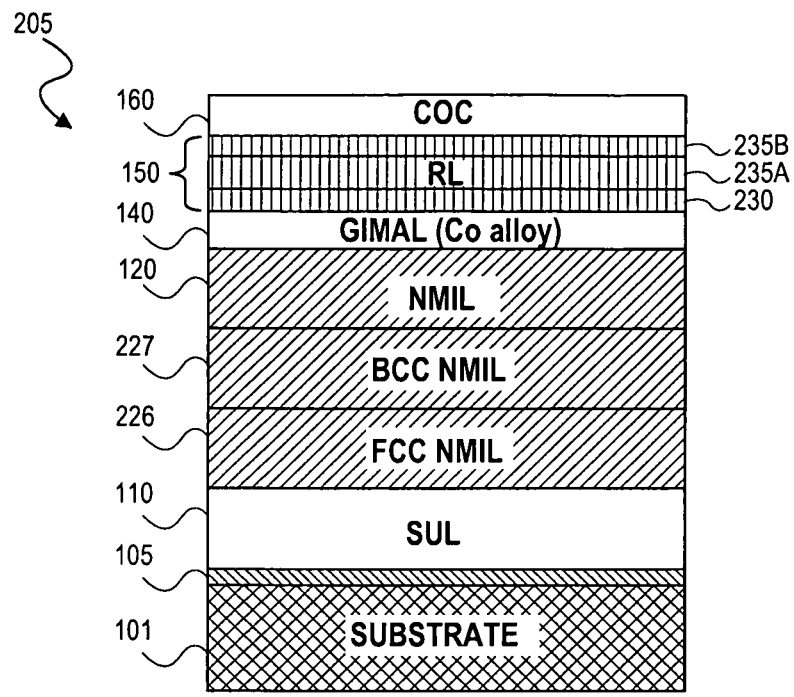

FIG. 2B depicts another embodiment where a PMR media structure 205 includes three NIML layers disposed under a GIMAL. As shown, a BCC NIML 227 is disposed between the NMIL 120 and an FCC NMIL 226. Exemplary materials for the BCC NIML 227 include, but are not limited to Cr and CrMn. In such an embodiment, the FCC NMIL 226 may include any of those FCC materials described for the FCC or HCP NMIL 225. Thus, in a particular embodiment the GIMAL 140 is disposed on the NMIL 120, which is an HCP material (e.g., a Ru layer), with the HCP material of NMIL 120 disposed on the BCC NIML 227 (e.g., Cr), which is disposed on the FCC or HCP NMIL 225 (e.g., NiW). In still other embodiments, an amorphous material layer (not depicted), such as, but not limited to, carbon (C), Cr, Ta, Ti, and alloys such as CrTi, TiW and NiNb may also be deposited over the SUL 110.

As depicted in FIGS. 1, 2A and 2B, a magnetic recording layer 150, including one or more layers, is disposed over the GIMAL 140. The magnetic recording layer 150 may be any thickness used in the art with an exemplary thickness being between 5 nm and 20 nm. Embodiments utilizing more than one material in the magnetic recording layer 150 may include one or more capping layer over a bottom recording layer. FIGS. 2A and 2B depict exemplary embodiments employing a first capping layer 235A and a second capping layer 235B over a bottom magnetic recording layer 230. In one exemplary embodiment, the bottom magnetic recording layer 230 is a cobalt alloy, although any magnetic alloys known in the art may also be employed. In a further embodiment, cobalt is alloyed with chromium to form a CoCr alloy having a lesser amount of Cr than in the GIMAL 140 (i.e. sufficiently low Cr to be adequately magnetic). The CoCr may be further alloyed with other elements and oxide materials. In an exemplary embodiment, Pt is alloyed with CoCr to form a CoCrPt. In one embodiment, an alloyed material layer of the magnetic recording layer 150 includes $CoCr_xPt_y$, where x is between 10 and 22 and y is between 10 and 25. In a preferred embodiment, the amount of Pt in the bottom magnetic recording layer 230 is approximately the same as an amount of Pt in the GIMAL 140. In an alternate embodiment, the amount of Pt in the bottom magnetic recording layer 230 is approximately the same as an amount of Pd in the GIMAL 140.

In further embodiments one or more oxide materials may be included in the magnetic recording layer 150. Exemplary systems include a CoCrPt-oxide. In one such embodiment, the bottom magnetic recording layer 230 includes a CoCrPt alloy, a non-cobalt, non-chromium oxide and at least one of a cobalt oxide and a chromium oxide. For example, in an embodiment employing both Co and Cr, the bottom magnetic recording layer 230 includes both a cobalt oxide and a chromium oxide in addition to a non-cobalt, non-chromium oxide, such as $SiO_2$ (although any such oxide described for the GIMAL 140 may be included). For the capping layers 235A and 235B, the constituent amounts in the bottom magnetic recording layer 230 may be varied in any manner known in the art. For example, for a CoCrPt-oxide system, the capping layers 235A and 235B may have more or less Cr and Pt and oxide material. In certain embodiments, amounts of cobalt oxide of a capping layer may be reduced relative to those provided for a bottom magnetic recording layer. Additionally, like the GIMAL 140, small amounts of other elements, such as, but not limited to, boron (B), molybdenum (Mo), niobium (Nb), tantalum (Ta), titanium (Ti), zirconium (Zr), tungsten (W), hafnium (Hf), osmium (Os), iridium (Ir), rhenium (Re) may also be added to any of the layers in the magnetic recording layer 150.

Completing the magnetic media structure depicted in FIGS. 1, 2A and 2B, one or more layers may be formed on top of the magnetic recording layer 150. For example, an overcoat (OC) may be used on top of the top magnetic recording layer to meet tribological requirements such as contact-start-stop (CSS) performance and corrosion protection. Predominant materials for the overcoat layer are carbon-based materials, such as hydrogenated or nitrogenated carbon to form a carbon over coat (COC) 160. A lubricant may be placed (e.g., by dip coating, spin coating, etc.) on top of the overcoat layer to further improve tribological performance. Exemplary lubricants include perfluoropolyether or phosphazene lubricant.

Figure 3:
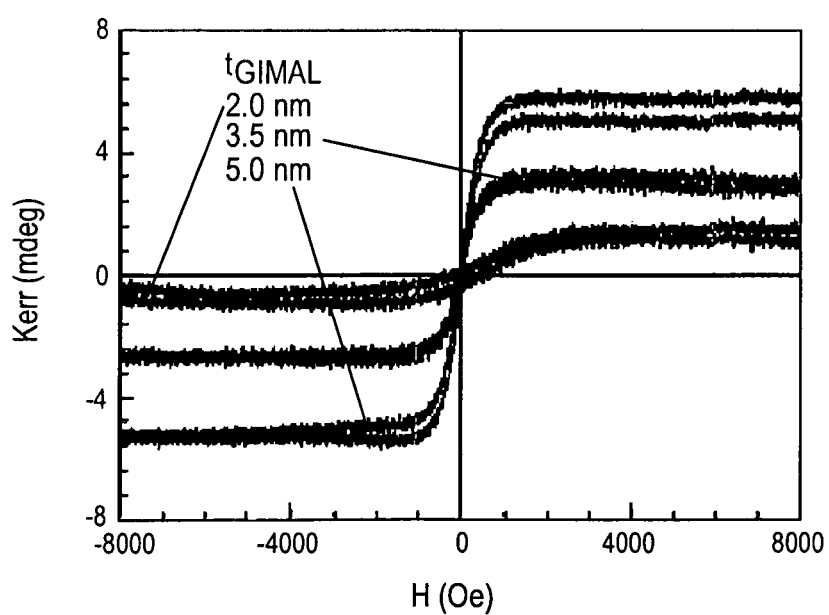
FIG. 3 illustrates a polar Kerr loop of a grain isolation magnetic anisotropy layer (GIMAL) in accordance with an embodiment of the present invention on a ruthenium layer.

FIGS. 3 through 7 illustrate characteristics of the GIMAL 140 and of PMR media structures employing a GIMAL. FIG. 3 depicts a polar Kerr loop of a GIMAL on top of a Ru layer. The GIMAL material composition was in the range of $[(Co_{20-60}Cr_{0-40}Pt)_{0-40}]_{85-94}$-$oxide_{5-16}]$ with a thickness of approximately 0.5 nm to 5 nm formed by non-reactively sputtering a target having a composition of $CoCr_{25}Pt_{18}$—$SiO_2)_6(CoO)_4$. As depicted in FIG. 3, the 2 nm thick GIMAL exhibits very weak superparamagnetism and should not deteriorate magnetic properties in the bottom magnetic layer caused by interlayer exchange coupling between the GIMAL and a magnetic recording layer deposited on the GIMAL (e.g. RL 150 on GIMAL 140). As previously described, additional substitution of Co with Cr in a GIMAL will further reduce magnetization, so that certain GIMAL embodiments are non-magnetic. An x-ray diffraction (XRD) θ-2θ scan of the GIMAL on Ru structure (not depicted) indicated a reduced Ru peak, higher angle peak position and broader full width half maximum (FWHM) relative to a Ru layer alone. This indicates that lattice atoms in the GIMAL are highly strained to match the Ru lattice.

Figure 4A:
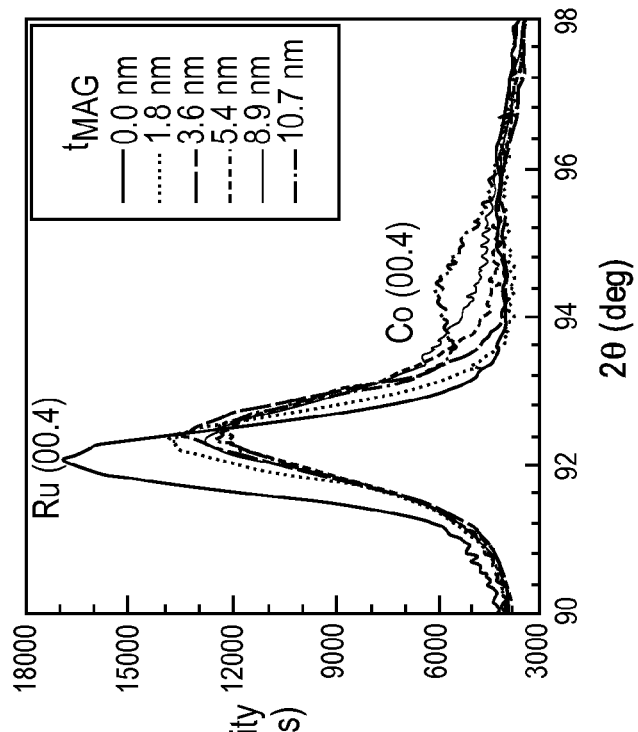
FIGS. 4A-4B illustrate XRD data for a magnetic layer formed on a GIMAL in accordance with an embodiment of the present invention as compared to a magnetic layer formed on a ruthenium layer.
Figure 4B:
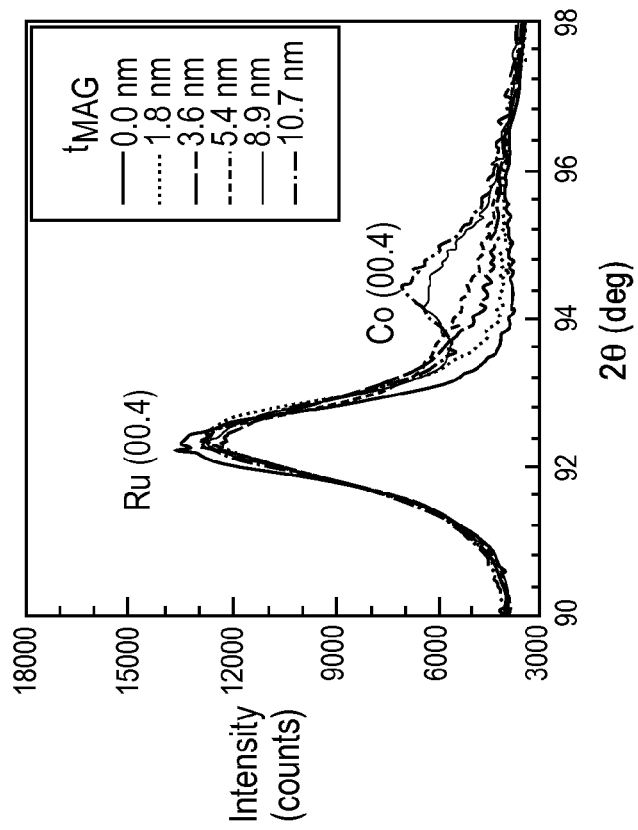

FIG. 4A depicts an XRD θ-2θ scan of a structure including a 2 nm thick GIMAL on a Ru layer, as provided for the polar Kerr measurement depicted in FIG. 3, with a magnetic layer of various thicknesses disposed on the GIMAL. The magnetic layer for this measurement was a CoCrPt-oxide material having a lower amount of Cr that that of the GIMAL. In comparison, FIG. 4B depicts an XRD scan of a second structure lacking a GIMAL, but otherwise the same as that measured in FIG. 4A (i.e. magnetic layer on Ru layer). As shown in FIGS. 4A and 4B, the crystallinity of core grains in the magnetic layer formed on the GIMAL is improved relative to that of core grains in the magnetic layer formed on the Ru layer. As shown in FIG. 4B, the Ru intensity of the of the 1.8 nm thick magnetic layer without GIMAL is significantly reduced while FIG. 4A shows the Ru intensity of the 1.8 thick magnetic layer on a 2 nm GIMAL is only slightly reduced. The distinction indicates the GIMAL reduces film strain between the Ru layer and magnetic layer, providing better crystallinity of the Co peak visible in FIGS. 4A and 4B. Rocking curve measurements (not depicted) indicated a thin GIMAL does not deteriorate crystallographic c-axis dispersion ($\Delta\theta_{50}$) in Ru in the range of 3.3°-3.5°.

Figure 4C:
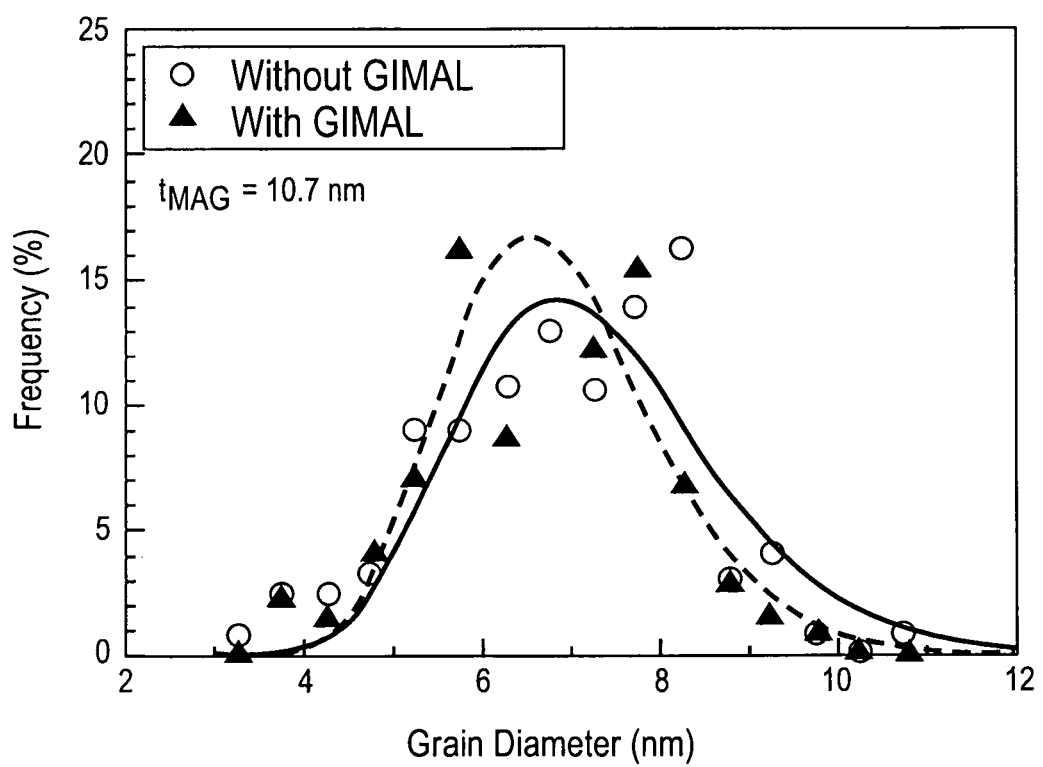
FIG. 4C illustrates core grain size for a magnetic layer formed on a GIMAL in accordance with an embodiment of the present invention compared to a magnetic layer formed on a ruthenium layer.

FIG. 4C illustrates a comparison of grain size distribution for a structure including a 2 nm thick GIMAL on a Ru layer, as provided for the polar Kerr measurement depicted in FIG. 3, with a magnetic layer of approximately 10.7 nm disposed on the GIMAL. The curves are fit by $\log_{normal}$ distribution which illustrates a GIMAL improves grain size distribution (reduced spread) without affecting grain size and center-to-center width. The mean grain size was measured as 6.9+/−1.4 nm without the GIMAL and 6.7+/−1.2 nm with the GIMAL. Center-to-center measurements were 8.1 nm for both treatments.

Figure 5B:
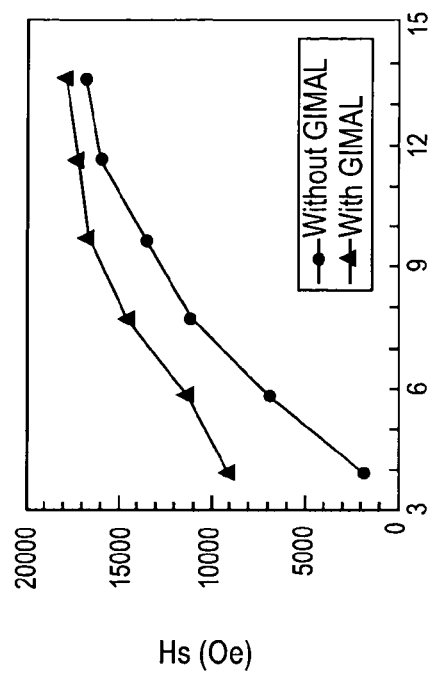
FIGS. 5A-5D illustrate magnetic properties of for a magnetic layer formed on a GIMAL in accordance with an embodiment of the present invention as compared to a magnetic layer formed on a ruthenium layer.
Figure 5D:
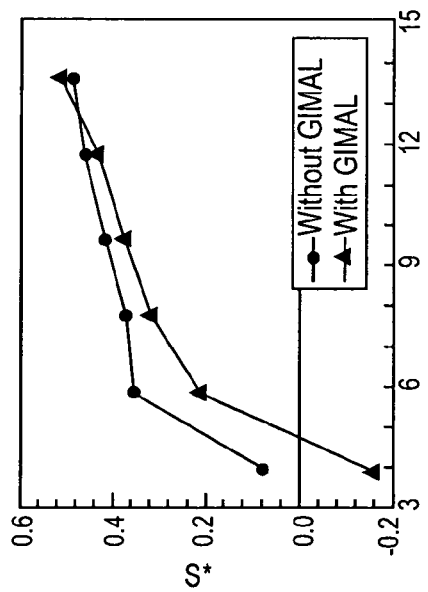
Figure 5A:
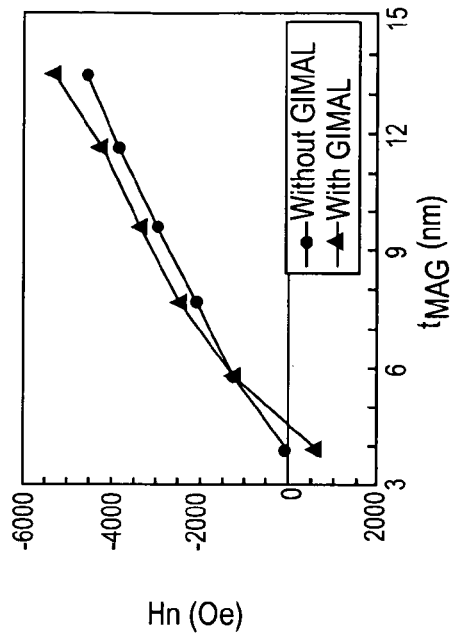
Figure 5C:
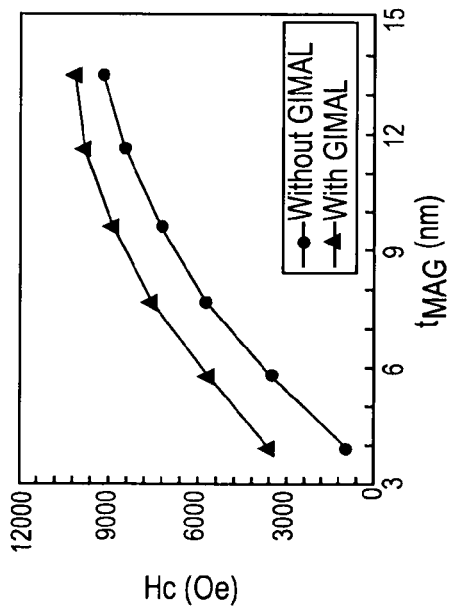
Figure 6:
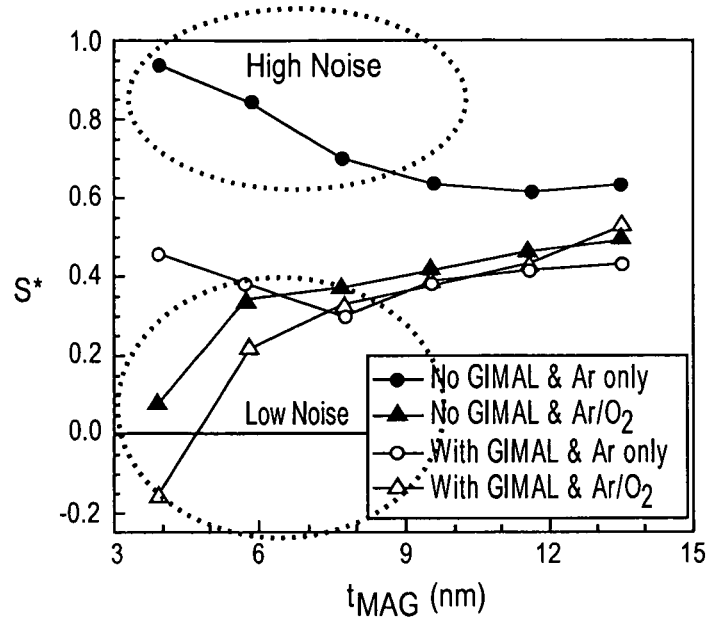
FIG. 6 illustrates coercivity squareness for a magnetic layer formed on a GIMAL in accordance with an embodiment of the present invention as compared to a magnetic layer formed on a ruthenium layer.

FIGS. 5A-5D illustrate magnetic properties of structures including a Cr adhesion layer, synthetic antiparallel soft magnetic underlayer and NiW/Ru intermediate layers, as depicted in FIG. 2A. Over that structure, a magnetic layer with thicknesses between 3.9 nm and 13.5 nm was formed with and without a GIMAL in much the same manner as described for FIGS. 4A and 4B. The effect of a GIMAL (2 nm) on magnetic properties of the magnetic layer formed with and without reactive ($O_2$) sputtering were investigated. For both reactive and non-reactive sputtering, insertion of the GIMAL increases $H_c$ and saturation field ($H_s$) relative to the effect on nucleation field ($H_n$), resulting in a reduction of coercivity squareness (S*). FIGS. 5A through 5D illustrate particular magnetic properties when reactive sputtering is employed. As shown in FIGS. 5A and 5D, coercivity and saturation field are notably high along the whole thickness range of the magnetic layer ($t_{mag}$). A reduction in the thickness of a magnetic layer to achieve a given $H_c$ is therefore made possible by insertion of the GIMAL. For example, in applications where an $H_c$ of 7 KOe in a bottom magnetic layer is needed, thickness of the bottom magnetic layer may be reduced from approximately 9.4 nm to 7.1 nm. As depicted in FIG. 6, where the magnetic layer was formed with non-reactive sputtering, addition of the GIMAL lowered S* from 0.95 to 0.45, indicating a GIMAL significantly reduces the intergranular exchange coupling constant ($A_{ex}$) without deteriorating $H_c$. Such increases in grain isolation indicate a GIMAL can provide a lower noise microstructure.

FIGS. 7A-7I illustrate comparisons of media performance in magnetic and spin-stand measurement of a full stack media structure prepared substantially as described in FIG. 2A. Full stack media structures included a Cr adhesion layer, synthetic antiparallel soft magnetic underlayer, a NiW interlayer and a Ru intermediate layer. A magnetic recording layer including a bottom layer, first capping layer and second capping was formed as previously described in reference to FIG. 2A. The bottom magnetic layer was reactively sputtered while the capping layers were non-reactively sputtered. The GIMAL thickness was varied from 0 to greater than 3 nm while other structure and sputtering conditions were invariant.

Figure 7C:
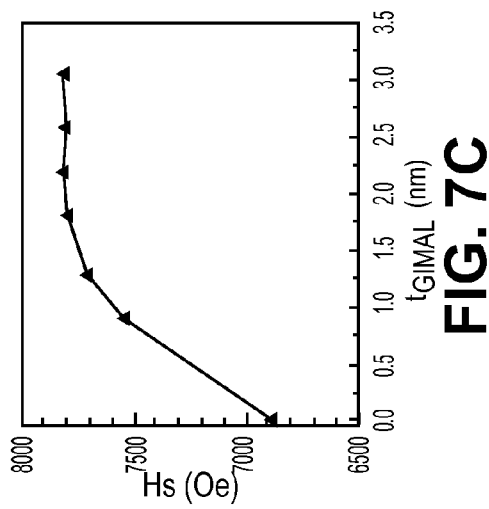
FIGS. 7A-7I illustrate magnetic and spin stand measurements of full stack media including a GIMAL in accordance with an embodiment of the present invention compared to that of a media structure lacking a GIMAL.
Figure 7B:
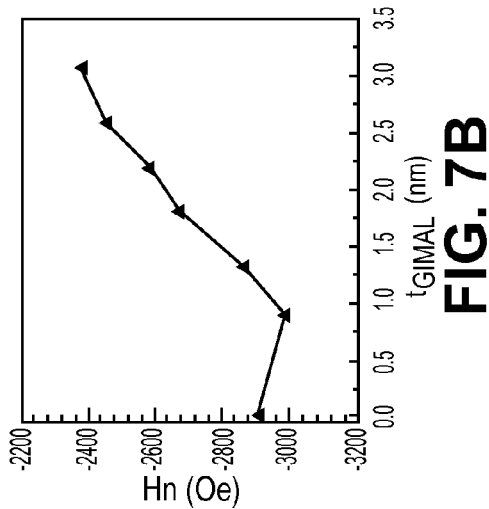
Figure 7A:
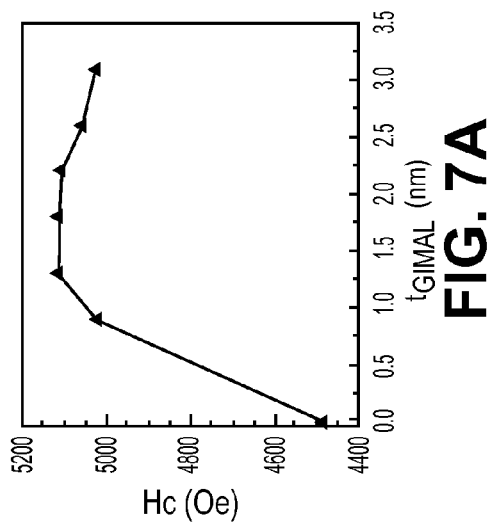
Figure 7E:
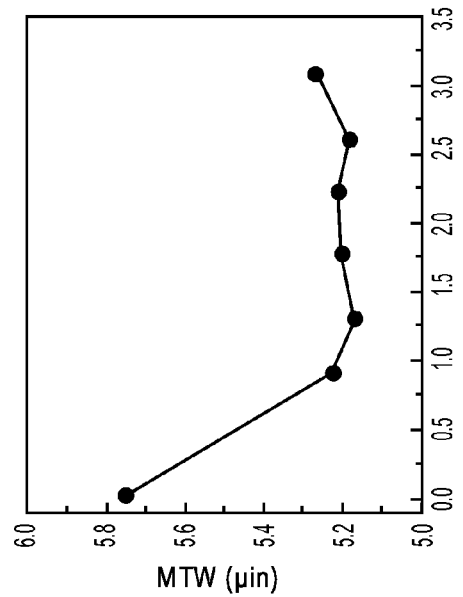
Figure 7D:
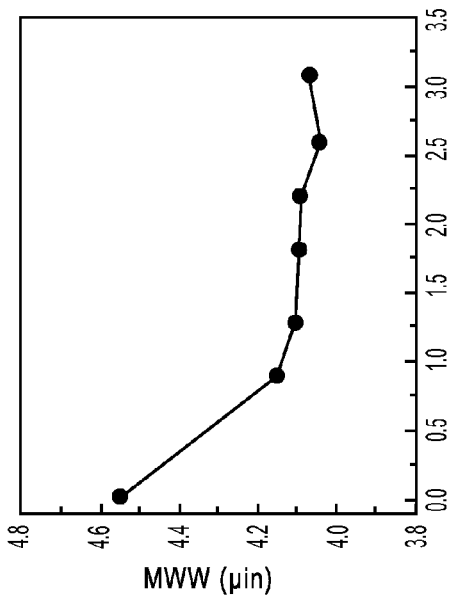
Figure 7F:
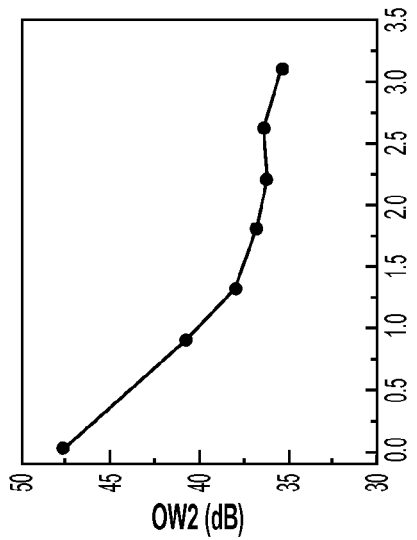
Figure 7G:
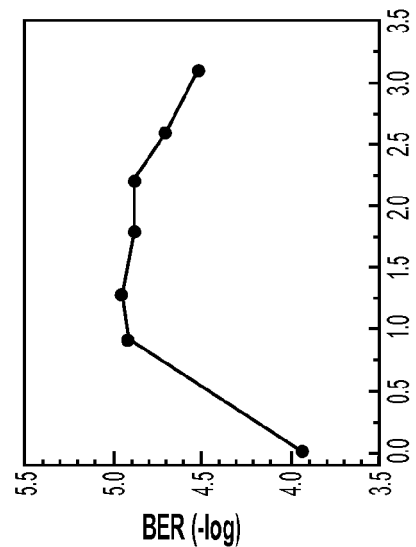
Figure 7H:
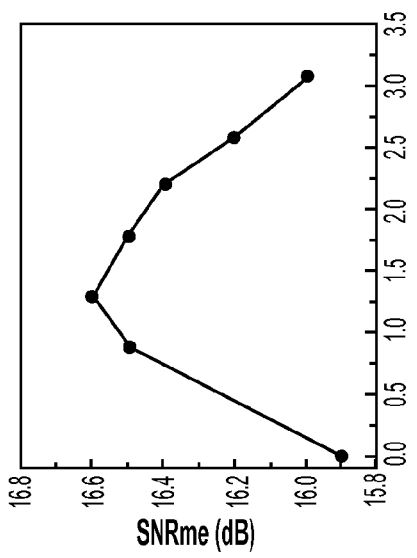
Figure 7I:
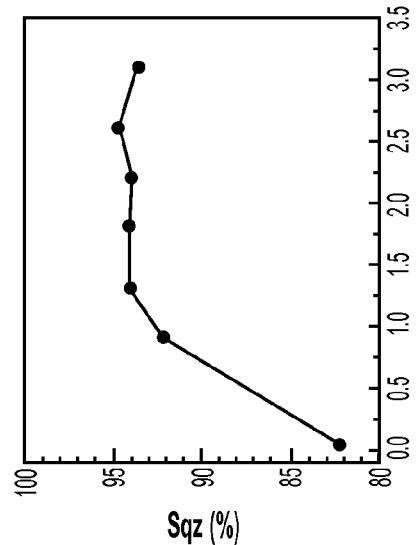

As shown in FIG. 7A, $H_c$ increases from 4.49 kOe without a GIMAL to 5.02 kOe with a 0.9 nm GIMAL and reaches a maximum of 5.12 kOe at a 1.3 nm thick GIMAL. $H_n$ and $H_s$ are depicted in FIGS. 7B and 7C, respectively. As depicted in FIGS. 7D and 7E, magnetic write width (MWW), magnetic total width (MTW) including MWW and erase band improved with a 0.9 nm GIMAL. As depicted in FIGS. 7F, 7H and 7I, SNR, Squeeze and media BER, respectively, also improved for the 0.9 nm GIMAL relative to the media structure lacking a GIMAL. In the particular treatments illustrated, both SNR and BER begin to deteriorate for GIMAL thicknesses greater than about 1.3 nm, likely due to increased transition noise, but the values remain notably higher than those without a GIMAL. As depicted in FIG. 7G, reversal overwrite (OW2) displays a trend consistent with enhanced $H_c$ and $H_s$.

Figure 8:
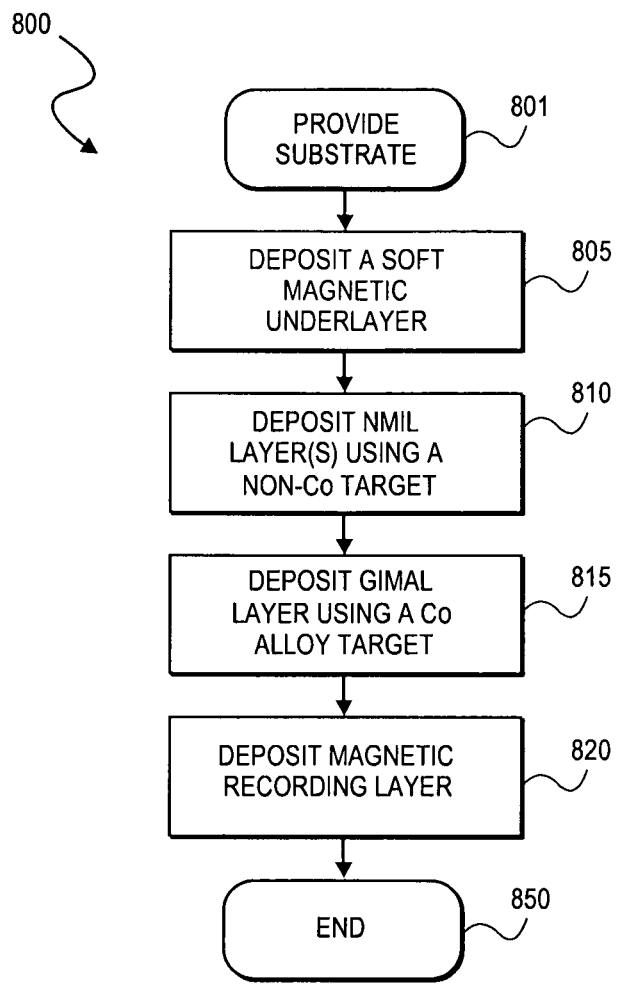
FIG. 8 illustrates one embodiment of a method of manufacturing perpendicular magnetic recording disk in accordance with an embodiment of the present invention.

FIG. 8 illustrates one embodiment of a method of manufacturing perpendicular magnetic recording disk having a media structure such as any of those describe elsewhere herein in reference to FIGS. 1, 2A and 2B. A substrate 101 is generated, or otherwise provided, at operation 801. The generation of a substrate for a magnetic recording disk is known in the art; accordingly a detailed discussion is not provided. In one embodiment, the substrate 101 may be plated (e.g., with NiP) and may also be polished and/or textured prior to subsequent deposition of layers.

In operation 805, the SUL 110 is deposited over substrate 101. Operation 805 may include deposition of the seed layer 105 on the substrate 101. The SUL 110 is then deposited on the seed layer 105, which may include depositing a synthetic antiferromagnet (SAF) structure. In operation 810 the NIML 120 is deposited over the SUL 110. One or more additional non-magnetic intermediate layers (e.g. HCP or FCC NIML 225) may also be deposited over the SUL 110 prior to depositing the NIML 120.

At operation 815, the GIMAL 140 is deposited on NIML 120. In an embodiment, the GIMAL 140 is deposited with a reactive sputtering process where oxygen ($O_2$) is introduced into the sputtering chamber during deposition of the GIMAL 140. $O_2$ may be provided at a desired partial pressure with an oxygen source gas diluted with an inert source gas (e.g. Ar). The amount of $O_2$ provided during deposition may vary depending on the target alloy composition, thickness of the GIMAL 140 and deposition system configuration, etc. In particular embodiments, the target alloy oxide content is sufficiently high that only a small amount of $O_2$ is provided, for example, at a partial pressure range between approximately 0 mTorr (i.e. non-reactive sputtering) and 1.2 mTorr. In alternative reactive sputtering embodiments, $O_2$ is provided at a higher partial pressure, for example between approximately 0.2 mTorr and 3 mTorr.

For operation 815, the sputter target alloy composition may be any capable of achieving the compositions described elsewhere herein for the GIMAL 140. In one embodiment, the sputter target includes a metal matrix having Co and one or more oxide materials. In a particular embodiment, the total amount of atomic oxygen is between approximately 10 at. % and 25 at. % of the target alloy. In certain embodiments, the oxide material in the target alloy includes both a cobalt oxide and a non-cobalt oxide (e.g., those previously described for the GIMAL 140). The Co oxide may include Co in any oxidation state, such as +1, +2 and +3. However, in a particularly advantageous embodiment the Co oxide is the divalent, Co(II) oxide (CoO). The additional oxygen provided by the cobalt oxide contained in the target has been found to enhance oxidization of Cr atoms in the GIMAL 140. Relatively less Cr may improve grain isolation. While not bound by theory, the relatively low Gibbs energy of CoO may cause a portion of oxygen atoms (O) from CoO to partially transfer into a metal matrix of the sputter target and improve CoO particle adhesion with a metal matrix, providing less oxide spitting and target arcing issues and enabling a relatively higher CoO target concentration than non-cobalt oxides. A further portion of the oxygen atoms remaining as CoO particles may be expected to provide a readily dissociable source of oxygen in the GIMAL 140. The target alloy may include cobalt oxide and non-cobalt oxide at a compositional stoichiometric ratio between 1:10 and 10:1 cobalt oxide to non-cobalt oxide.

In addition to cobalt, the metal matrix may include any elements commonly employed for a recording layer as long as the composition remains nonmagnetic or superparamagnetic subsequent to deposition. In a particular embodiment, the metal matrix includes Co and Cr combined with any or all of Pt, Pd or Ru, so that one particular system of target alloy is CoCr(Pt, Pd or Ru)-(non-cobalt oxide+cobalt oxide). Other elements as described for the GIMAL 140, such as B or Ta, may also be included in the target alloy.

In still other embodiments, the various constituents of the GIMAL 140 (e.g., metal matrix species, non-cobalt oxide and cobalt oxide) may be deposited on a substrate using a plurality of targets. Multi-target deposition methods are known in the art and generally consist of simultaneously sputtering separate targets or target portions, each of differing composition to form a mixture of the plurality of target compositions on a substrate. Each target of a multi-target system may be in a separate sputter station and each sputter station may include, for example, a DC magnetron source (for metal targets) and RF magnetron source (e.g. for oxide targets). Thus, while one exemplary embodiment includes a single sputter target of a CoCrPt-(non-cobalt oxide+cobalt oxide) alloy which is DC magnetron sputtered to form a GIMAL over a substrate, one of ordinary skill in the art will appreciate a similar multi-target process may also be performed. For example, a CoCrPt target may be DC magnetron sputtered while a cobalt oxide target and a non-cobalt oxide target are RF magnetron sputtered to form the GIMAL 140.

At operation 820, the magnetic recording layer 150 is deposited on the GIMAL 140. In particular embodiments, deposition of the recording layer 150 may include depositing the bottom magnetic recording layer 230 on the GIMAL 140 and depositing one or more capping layers 235 over the bottom magnetic recording layer 230. In an embodiment, the bottom magnetic recording layer 230 is deposited with a reactive sputtering process where oxygen ($O_2$) is introduced into the sputtering chamber. The amount of $O_2$ provided during deposition may vary depending on the target alloy composition, thickness of the bottom magnetic recording layer 230 and deposition system configuration, etc. In particular embodiments, the presence of the GIMAL 120 and/or the target alloy oxide content is sufficient for the bottom magnetic recording layer 230 to be deposited with only a small amount of $O_2$, for example, at a partial pressure range between approximately 0 mT (i.e. non-reactive sputtering) and 1.5 mTorr. In alternative reactive sputtering embodiments, $O_2$ is provided at a higher partial pressure, for example between approximately 0.2 mTorr and 3 mTorr.

For operation 820, the sputter target alloy composition may be any capable of achieving the compositions described elsewhere herein for the magnetic recording layer 150. In one embodiment, the sputter target includes a metal matrix having Co and one or more oxide materials. In certain embodiments, the oxide material in the target alloy includes both a cobalt oxide and a non-cobalt oxide. In a further embodiment the target alloy includes cobalt oxide and non-cobalt oxide at a compositional stoichiometric ratio between 1:10 and 10:1 cobalt oxide to non-cobalt oxide. In addition to Co, the metal matrix may include any elements commonly employed for a recording layer. In a particular embodiment, the metal matrix includes Co and Cr combined with either or both of Pt and Ru, so that one particular system of target alloy is CoCr(Pt or Ru)-(non-cobalt oxide+cobalt oxide). In one such embodiment, the amount of Cr in the target for operation 820 is relative less than that for operation 815 while the amount of Pt or Ru is substantially the same as that for operation 815 for lattice matching of the recording layer (e.g., bottom recording layer 230) to the GIMAL 140. Operation 850 completes the method 800 with a deposition of a protection layer, such as the COC 160.

The deposition of each of the seed layer 105, SUL 110, NMIL 120, GIMAL 140, recording layer 150 and the protection layer can be accomplished by a variety of methods well known in the art, for example, electroless plating, sputtering (e.g., static or in-line), chemical vapor deposition (CVD), ion-beam deposition (IBD), etc. Static sputter systems are available from manufacturers such as Intevac Inc. of Santa Clara, Calif. and Canon-Anelva Corp. of Japan. With in-line sputtering systems, disk substrates are loaded on a pallet that passes through a series of deposition chambers the deposit films successively on substrates. In-line sputtering systems are available from manufacturers such as Ulvac Corp. of Japan.

Figure 9:
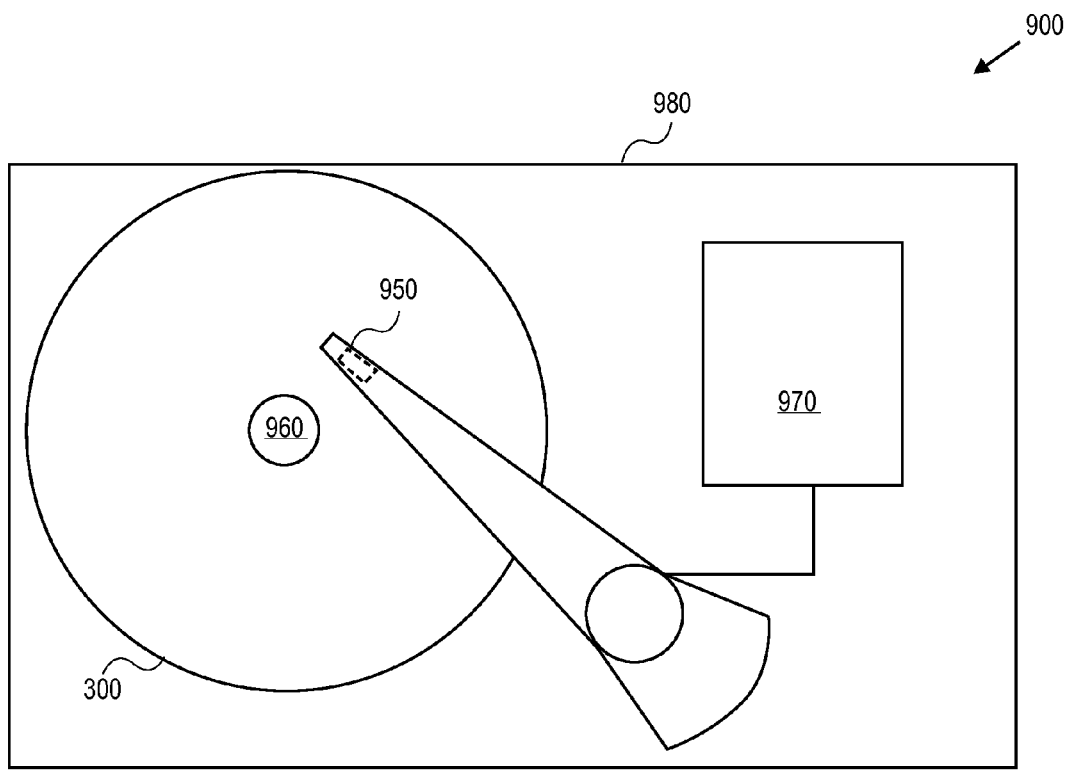
FIG. 9 illustrates a disk drive including a perpendicular magnetic recording disk in accordance with an embodiment of the present invention.

FIG. 9 illustrates a disk drive having disk 300. Disk drive 900 may include one or more disks 300 to store datum. Disk 300 resides on a spindle assembly 960 that is mounted to drive housing 980. Data may be stored along tracks in the magnetic recording layer of disk 300. The reading and writing of data is accomplished with head 950 that has both read and write elements. The write element is used to alter the properties of the perpendicular magnetic recording layer of disk 300. In one embodiment, head 950 may have a magneto-resistive (MR) and, in particular, a giant magneto-resistive (GMR) read element and an inductive write element. In an alternative embodiment, head 950 may be another type of head, for example, an inductive read/write head or a Hall effect head. A spindle motor (not shown) rotates spindle assembly 960 and, thereby, disk 300 to position head 950 at a particular location along a desired disk track. The position of head 950 relative to disk 300 may be controlled by position control circuitry 970. The use of disk 300 fabricated in the manners discussed above may improve the performance of the perpendicular magnetic recording layer of disk 300.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A perpendicular magnetic recording disk, comprising:
   a soft magnetic underlayer;
   a first intermediate layer disposed over the soft magnetic layer, wherein the first intermediate layer is non-magnetic;
   a second intermediate layer disposed over the first intermediate layer, the second intermediate layer comprising a non-magnetic or superparamagnetic Co alloy-oxide material; and
   a magnetic recording layer disposed over the second intermediate layer,
   wherein the magnetic recording layer is a Co alloy and is in contact with the second intermediate layer.

2. The perpendicular magnetic recording disk as in claim 1, wherein the first intermediate layer is a substantially Co-free pseudo-HCP or substantially Co-free HCP material, and wherein the first intermediate layer comprises Ru.

3. The perpendicular magnetic recording disk as in claim 2, wherein the non-magnetic or superparamagnetic Co alloy-oxide material comprises at least one non-cobalt oxide grain isolation material.

4. The perpendicular magnetic recording disk as in claim 3, wherein the at least one non-cobalt oxide is selected from the group consisting of: $SiO_2$, $TiO_2$, $Ti_2O_3$, $CrO_2$, $Cr_2O_3$, $Ta_2O_5$, $Nb_2O_5$, NiO, $WO_2$, $WO_3$, $ZrO_2$, $HfO_2$, $V_2O_5$ and $Al_2O_3$.

5. The perpendicular magnetic recording disk as in claim 1, further comprising an FCC intermediate layer disposed between the first intermediate layer and the soft magnetic underlayer, wherein the FCC intermediate layer is a material selected from the group consisting of: Ir, NiW, NiTi, NiFeCr, PtCr, PdCr and IrMn.

6. The perpendicular magnetic recording disk as in claim 5, further comprising a BCC intermediate layer disposed between the first intermediate layer and the FCC intermediate layer, wherein the BCC intermediate layer is a material selected from the group consisting of: Cr and CrMn.

7. The perpendicular magnetic recording disk as in claim 1, wherein the second intermediate layer is a superparamagnetic Co alloy with a saturation magnetization ($M_s$) less than approximately 200 emu/cm$^3$.

8. The perpendicular magnetic recording disk as in claim 1, wherein the second intermediate layer further comprises at least one of cobalt oxide and chromium oxide, and at least one non-cobalt oxide, non-chromium oxide grain isolation material.

9. The perpendicular magnetic recording disk as in claim 1, wherein both the magnetic recording layer and the second intermediate layer comprise Cr with the second intermediate layer having a greater amount of Cr than the magnetic recording layer.

10. The perpendicular magnetic recording disk as in claim 9, wherein the second intermediate layer further comprises at least one of Pt and Pd.

11. The perpendicular magnetic recording disk as in claim 10, wherein the magnetic recording layer further comprises Pt.

12. The perpendicular magnetic recording disk as in claim 1, wherein the second intermediate layer has a thickness between approximately 0.5 and 10 nanometers.

13. The perpendicular magnetic recording disk as in claim 1, wherein the first intermediate layer is between two and five times the thickness of the second intermediate layer.

14. A disk drive, comprising:
a head having a magneto-resistive read element; and
the perpendicular magnetic recording disk of claim 1 operatively coupled to the head.

15. The disk drive as in claim 14, wherein the first intermediate layer is a granular HCP material comprising at least one of Ru, Rh and Re, the first intermediate layer is between two and five times the thickness of the second intermediate layer, and wherein both the magnetic recording layer and the second intermediate layer comprise Cr with the second intermediate layer having a greater amount of Cr than the magnetic recording layer.

16. The disk drive as in claim 15, wherein the magnetic recording layer further comprises Pt and the second intermediate layer further comprise at least one of Pd and Pt.

17. The disk drive as in claim 16, the magnetic recording layer and second intermediate layer further comprise at least one of cobalt oxide and chromium oxide and at least one non-cobalt oxide, non-chromium oxide grain isolation material.

18. A method of manufacturing a perpendicular magnetic recording disk, the method comprising:

depositing a soft magnetic underlayer over a substrate;
depositing a first intermediate layer over the soft magnetic layer, the first intermediate layer being non-magnetic;
depositing second intermediate layer over the first intermediate layer, the second intermediate layer comprising a non-magnetic or superparamagnetic Co alloy-oxide material; and
depositing a magnetic recording layer over the second intermediate layer,
wherein the magnetic recording layer is a Co alloy and is in contact with the second intermediate layer.

19. The method as in claim 18, wherein depositing the first intermediate layer further comprises depositing a substantially Co-free granular HCP material including at least one of Ru, Rh, and Re.

20. The method as in claim 18, wherein depositing the second intermediate layer further comprises depositing a material to a thickness between approximately 0.5 and 10 nanometers.

21. The method as in claim 18, wherein the magnetic recording layer is deposited directly on the second intermediate layer and wherein depositing the magnetic recording layer further comprises sputtering a target alloy comprising Co.

22. The method as in claim 18, wherein depositing the second intermediate layer further comprises sputtering a target alloy comprising a non-cobalt oxide.

23. The method as in claim 22, wherein depositing the second intermediate layer further comprises sputtering a target alloy including a greater amount of Cr than that of the target sputtered during deposition of the magnetic recording layer.

24. The method as in claim 23, wherein depositing the second intermediate layer further comprises sputtering a target alloy including at least one of Pt or Pd, wherein depositing the magnetic recording layer further comprises sputtering a target alloy including Pt, and wherein the Pt content is approximately equal to that sputtered during deposition of the second intermediate layer.

25. The method as in claim 22, wherein depositing the second intermediate layer further comprises reactively sputtering a target alloy comprising a cobalt oxide and a non-cobalt oxide with a compositional stoichiometric ratio between 1:10 and 10:1 cobalt oxide to non-cobalt oxide.

26. The method as in claim 25, wherein depositing the second intermediate layer further comprises reactively sputtering the target alloy with an $O_2$ partial pressure between 0.2 mTorr and 3 mTorr.

27. A perpendicular magnetic recording disk, comprising:
a soft magnetic underlayer;
a first intermediate layer disposed over the soft magnetic layer, wherein the first intermediate layer is non-magnetic;
a second intermediate layer disposed over the first intermediate layer, the second intermediate layer comprising a non-magnetic or superparamagnetic Co alloy, wherein the second intermediate layer further comprises at least one of cobalt oxide and chromium oxide, and at least one non-cobalt oxide, non-chromium oxide grain isolation material; and
a magnetic recording layer disposed over the second intermediate layer.

28. The perpendicular magnetic recording disk as in claim 27, wherein the second intermediate layer comprises at least one non-cobalt oxide selected from the group consisting of: $SiO_2$, $TiO_2$, $Ti_2O_3$, $CrO_2$, $Cr_2O_3$, $Ta_2O_5$, $Nb_2O_5$, NiO, $WO_2$, $WO_3$, $ZrO_2$, $HfO_2$, $V_2O_5$ and $Al_2O_3$.

* * * * *